3,484,251
CASSEROLE COMPOSITION
Benjamin Lawrence, Springfield Township, Hamilton County, and Frank G. Morris, Jr., Wyoming, Ohio, assignors to The Procter & Gamble Company, Cincinnati, Ohio, a corporation of Ohio
No Drawing. Filed June 27, 1966, Ser. No. 560,795
Int. Cl. A23l 1/16
U.S. Cl. 99—85                                                    5 Claims

ABSTRACT OF THE DISCLOSURE

A casserole composition, which contains a pre-cooked and vacuum-dried alimentary paste prepared from a dough comprising flour, from 0.005% to 0.2% based on weight of flour, of an alimentary paste tenderizer selected from the group consisting of cysteine, water-soluble cysteine salts, and cysteine hydrochloride, and from 25–50% moisture based on weight of dough.

---

This invention relates broadly to packaged casserole compositions and particularly to quick cooking dry casserole compositions which contain an alimentary paste. The dry ingredients of the casseroles of this invention can be reconstituted without precooking of the alimentary paste merely by adding tap water to the packaged ingredients and heating them in a conventional oven.

As used herein the term "alimentary paste" is intended to have its customary broad connotation, including what are commonly known as macaroni products and noodles. Macaroni products are flour and water dough compositions which are pressed or extruded into any of a number of predetermined shapes and then dried. Noodles differ from macaroni products only in that the dough from which noodles are prepared contains whole eggs or egg yolks in addition to flour and water.

In recent years packaged casserole compositions have been marketed in an attempt to alleviate the tedious multistep procedures normally incident to home preparation of casserole dishes. However, no casserole product which contains an alimentary paste has been available which is capable of one-step preparation in a single dish, i.e., adding the packaged ingredients and liquid (such as water or milk) to a single pan or bowl and heating. The casserole compositions which are known in the prior art require a precooking step for the alimentary paste or, as a minimum, boiling water for addition to the packaged ingredients prior to heating of the casserole in an oven.

It is an object of this invention to provide an easy to prepare packaged casserole composition.

It is another object of this invention to provide a packaged casserole composition containing an alimentary paste which can be prepared with a single cooking operation.

These and other objects can be achieved by providing a packaged casserole composition which contains a pre-cooked and dried alimentary paste, the alimentary paste being prepared from a dough comprising flour and from about 25% to about 50% moisture, by weight of the dough, by forming the dough into pieces of desired shapes, cooking the pieces for from about 5 to about 15 minutes at from about 180° F. to about 270° F., and thereafter vacuum drying the pieces under an absolute pressure not in excess of about 15 inches of mercury to a final moisture content of from about 3% to about 15% by weight. Preferably, the final moisture content is from about 4% to about 12% by weight.

In contrast to prior art compositions, the casserole compositions disclosed herein can be prepared by adding cool or even cold aqueous liquid to the packaged ingredients and baking for from about 15 to about 40 minutes, preferably about 25 to about 30 minutes, at a temperature of from about 325° F. to about 425° F., preferably about 350° F. to about 400° F. The alimentary paste products in the baked casserole will have a soft, slightly chewy texture which is considered desirable in cooked alimentary pastes. Thus the use of the casserole compositions of this invention produce desirable cooked casseroles with a single cooking step and with the use of a single pan or other cooking dish such as an ovenproof Pyrex bowl.

A particularly preferred embodiment of this invention can be prepared by adding to the dough ingredients used in preparing the alimentary paste from about .005% to about 0.2% by weight of the flour of an alimentary paste tenderizer selected from the group consisting of cysteine, water soluble cysteine salts, and cysteine hydrochloride. Mixtures of these compounds can be used. It has been found that the inclusion of any of these alimentary paste tenderizers in the indicated amount will reduce the cooking time of the alimentary paste product by as much as about 20 to 40%.

In preparing the alimentary paste for the casseroles of this invention the dough is prepared in conventional mixers, and then rolled, extruded, or otherwise formed into pieces of desired shapes, all as is well known in the art. Typical mixers, rolling mills, extruders, the necessary auxiliary equipment and proper processing conditions are described, for example, in the "Quartermaster Food and Container Institute for the Armed Forces," vol. VIII, part III, Macaroni Products, 1st ed., May 1946.

While the precooking of the alimentary paste according to this invention can be accomplished by the use of steam or by heated rolls, the preferred method is by use of pans or trays of heated water. Preferably, the temperature of the water is from about 200° F. to about 210° F. These temperatures provide rapid cooking without the large amount of turbulence which is experienced during boiling which tends to tangle the cooked product.

Drying of the precooked alimentary paste can be accomplished in conventional vacuum dryers which utilize moderate temperatures, such as about 125° F. to about 200° F., and which can produce a maximum absolute pressure of about 15 inches of mercury. An example of such a vacuum dryer is a Precision Thelco Model 19 Vacuum Oven. In the preferred operation the drying temperature is from about 140° F. to about 160° F. and the absolute pressure is from about 0.5 to about 5.0 inches of mercury.

Drying of the alimentary paste as described above produces a dried product with a "puffed" appearance which rapidly rehydrates in the presence of water to form a desirably soft, slightly chewy product. Surprisingly, this dried alimentary paste rehydrates significantly faster than precooked alimentary pastes which are dried at atmospheric pressure or at low vacuums, thus making available the one step casseroles disclosed herein. The addition to the packaged ingredients of tap temperature water or other aqueous liquid at ambient temperature, and heating in a conventional oven is all that is required to prepare the finished casserole product.

While the casserole compositions disclosed herein have not been described in terms of ingredients other than the alimentary paste, it is well known that casseroles contain one or more additional ingredients. Any ingredient otherwise usable in casserole compositions and which can be preserved and included in a storage stable non-refrigerated package, can be used in the casseroles disclosed herein.

The most common of these ingredients are cheeses. The cheeses usable in casseroles of this invention can be any of those commonly used in casseroles, such as cheddar, parmesan, cottage, blue, Swiss and brick cheese and mixtures thereof. As indicated above, the most important requirement is that the cheese be in a form which will not require refrigeration during the normal storage life of the packaged casserole product. The most common method for preparing cheese in this form is by drying the cheese to reduce the moisture content to a storage stable level. Typical drying processes for cheese are described, for example, by H. W. von Loesecke in "Drying and Dehydration of Foods," 2nd ed., ch. 4, Reinhold, New York, 1955.

Vegetables such as peas, corn, string or lima beans, carrots and tomatoes are commonly used in casserole compositions and can be included in casseroles of this invention. These vegetables can be of the conventional "canned" variety, included in the casserole package as a discrete unit. Preferably they are dried, as by vacuum or freeze drying, and included in admixture with the other dry casserole ingredients. In this form the vegetables will be reconstituted by the addition of water and heating as described above.

In a similar manner preserved or dried meats, such as beef or chicken, or fish, such as salmon or tuna, can be included in the casseroles of this invention. As with the vegetables, these products can be canned and included in the casserole package as a discrete unit, but preferably are dried, as by vacuum or freeze drying, and included in admixture with the other casserole ingredients.

Most casseroles contain a sauce as a cheese or tomato sauce. Sauces of this type can be included in the casseroles of this invention as a discretely packaged unit or, preferably, the dry ingredients used in making such sauces are included in admixture with the other casserole ingredients and are reconstituted to form the desired sauce by the addition of the water and subsequent heating, as described above.

The following examples are given to demonstrate preparation of the casserole compositions disclosed herein, but are not intended to be limitations upon the invention. Unless indicated to the contrary all proportions and percentages given in the examples are on a weight basis.

EXAMPLE I

A dough was prepared by mixing the following ingredients in a Model C-10 Hobart Mixer at medium speed: wheat flour—1000 grams; egg yolk—110 grams; salt—20 grams; and water—270 grams. The dough had a moisture content of 33% by weight. The dough was kneaded by passing it three times through a two-roll mill; the kneaded dough was then passed through an Imperia Model 150 Pasta Maker (.022 inches between rolls) to produce ½-inch wide noodles.

The noodles were cooked in 208° F. water for 10 minutes, allowed to temper at room temperature for 30 minutes, and then dried under vacuum for 30 minutes in a Precision Thelco Model 19 Vacuum Oven. The oven temperature was 150° F. and the absolute pressure was 1.0 inches of mercury. The final moisture content of the dried noodles was 10% by weight.

One hundred and seventy-five grams of the vacuum dried noodles were mixed with 735 grams of tap water and 70 grams of grated dry cheddar cheese in an oven-proof Pyrex casserole dish and baked in a conventional oven for 20 minutes at 350° F., stirring occasionally. The baked product was an appetizing noodle and cheese casserole in which the noodles had a soft and slightly chewy texture.

When in the above example, the egg yolks are deleted from the alimentary paste composition and the amount of water is raised to 400 grams, and the resultant alimentary paste is cooked, vacuum dried and used to prepare a casserole, as described above, substantially similar results are obtained in that an appetizing macaroni and cheese casserole is obtained in which the macaroni has a soft and slightly chewy texture.

When in the above example, the amount of added water is adjusted to produce doughs with moisture contents of 25% and 50%; and/or, the noodles are cooked for 5 minutes and 15 minutes; and/or, the absolute pressure under which the noodles are vacuum dried is 0.5 inches of mercury and 15 inches of mercury; substantially similar results are obtained in that the noodles produced rehydrate sufficiently rapidly for use in the one-step casserole compositions disclosed herein.

EXAMPLE II

A dough composition was prepared using the same ingredients and proportions as in Example I, except that 0.5 grams of cysteine hydrochloride were added to the dough ingredients prior to mixing. Thereafter, the dough was processed as described in Example I to produce ½-inch wide noodles.

The noodles were suspended in boiling water for 10 minutes, allowed to temper for 30 minutes at room temperature, and then transferred to a Precision Thelco Model 19 Vacuum Oven where they were dried for 35 minutes at a temperature 150° F. The absolute pressure in the drying oven was 2.0 inches of mercury and the final moisture content of the noodles was 5% by weight.

One hundred and seventy-five grams of the noodles were then mixed with 80 grams of grated dry cheddar cheese. 625 grams of cold tap water and 125 grams of milk (45° F.). The mixture was placed in an oven-proof Pyrex casserole dish and heated in a conventional oven for 25 minutes at 350° F. The resultant product was a desirable noodle and cheese casserole in which the noodles had a soft and slightly chewy texture.

When in the above example, any or a combination of the following ingredients are added to the casserole composition (accompanied by sufficient water to rehydrate the additional ingredients where necessary), substantially similar results are obtained in that desirable casserole compositions are produced in which the noodles have a softt and slightly chewy texture: cheddar, parmesan, cottage, blue, Swiss and brick cheeses; peas, corn, string beans, lima beans, carrots and tomatoes; beef, chicken, salmon, and tuna; and cheese and tomato sauce.

What is claimed is:

1. A dry casserole composition containing pre-cooked and dried alimentary paste and capable of a one-step preparation of a casserole by adding a suitable liquid and heating, said alimentary paste being prepared from a dough comprising flour, from about 0.005% to about 0.02%, based on weight of flour, of an alimentary paste tenderizer selected from the group consisting of cysteine, water-soluble cysteine salts, and cysteine hydrochloride, and from about 25% to about 50% moisture, by weight of the dough, by forming the dough into pieces of desired shapes, cooking the pieces for from about 5 to about 15 minutes at about 180° F. to about 270° F., and thereafter vacuum drying the pieces under an absolute pressure not in excess of about 15 inches of mercury, to a final moisture content of from about 3% to about 15% by weight.

2. The composition of claim 1 wherein the pieces are cooked at from about 200° F. to about 210° F.

3. The composition of claim 1 wherein the pieces are vacuum dried at an absolute pressure of from about 0.5 to about 5.0 inches of mercury.

4. The compositiion of claim 1 wherein the final moisture content of the pieces is from about 4% to about 12% by weight.

5. The method of preparing the casserole composition of claim 1 comprising the steps of:
 (a) preparing a dough comprising flour, from about 0.005% to about 0.02%, based on weight of flour, of an alimentary paste tenderizer selected from the group consisting of cysteine, water-soluble cysteine salts, and cysteine hydrochloride, and from about 25 to about 50% moisture by weight of the dough;
(b) forming the dough into pieces of desired shapes;
(c) cooking the pieces for from about 5 to about 15 minutes at from about 180° F. to about 270° F.; and
(d) vacuum drying the pieces under an absolute pressure not in excess of about 15 inches of mercury to a final moisture content of from about 3% to about 15% by weight.

References Cited

UNITED STATES PATENTS

| | | | |
|---|---|---|---|
| 2,704,723 | 3/1955 | Poole | 99—85 |
| 2,768,086 | 10/1956 | Bliley | 99—192 |
| 3,241,981 | 3/1966 | Strashun et al. | 99—206 |
| 3,252,805 | 5/1966 | Sienkiewicz et al. | 99—85 |
| 3,352,686 | 11/1967 | Mancuso et al. | 99—85 |

RAYMOND N. JONES, Primary Examiner

PO-1050
(5/69)

UNITED STATES PATENT OFFICE
CERTIFICATE OF CORRECTION

Patent No. 3,484,251         Dated December 16, 1969

Inventor(s) Benjamin Lawrence and Frank G. Morris, Jr.

It is certified that error appears in the above-identified patent and that said Letters Patent are hereby corrected as shown below:

Col. 4, lines 53 and 74, the percentage "0.02%", each occurrence, should read -- 0.2% --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents